(12) United States Patent
Wang (10) Patent No.: US 10,691,669 B2
(45) Date of Patent: Jun. 23, 2020

(54) BIG-DATA PROCESSING METHOD AND APPARATUS

(71) Applicant: Huawei Technologies Co., Ltd., Shenzhen (CN)

(72) Inventor: Xiaoli Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 693 days.

(21) Appl. No.: 15/481,606

(22) Filed: Apr. 7, 2017

(65) Prior Publication Data

US 2017/0212923 A1    Jul. 27, 2017

Related U.S. Application Data (63) Continuation of application No. PCT/CN2015/097179, filed on Dec. 11, 2015.

(30) Foreign Application Priority Data

Dec. 26, 2014    (CN) .......................... 2014 1 0836226

(51) Int. Cl.
*G06F 16/00*      (2019.01)
*G06F 16/23*      (2019.01)
(Continued)

(52) U.S. Cl.
CPC ........ *G06F 16/2365* (2019.01); *G06F 9/4843* (2013.01); *G06F 9/5083* (2013.01);
(Continued)

(58) Field of Classification Search
CPC .... G06F 9/5083; G06F 16/30; G06F 16/2365; G06F 9/45558; G06F 16/24545; G06F 16/24554
See application file for complete search history.

(56) References Cited

U.S. PATENT DOCUMENTS 5,070,456 A  *  12/1991  Garneau ................. G09G 1/00
                                                          704/8
2009/0313635 A1    12/2009  Dasdan
(Continued)

FOREIGN PATENT DOCUMENTS

CN           102662639 A        9/2012
CN           102799486 A        11/2012
(Continued)

OTHER PUBLICATIONS

Machine Translation and Abstract of Chinese Publication No. CN102799486, dated Nov. 28, 2012, 9 pages.
(Continued)

*Primary Examiner* — Cheryl Lewis
(74) *Attorney, Agent, or Firm* — Conley Rose, P.C.

(57) ABSTRACT

A big-data processing method is provided. The method includes obtaining multiple key-value pair sets, where each of the key-value pair sets includes at least one key-value pair, and remainders of modulo operations on all key-value pairs in each key-value pair set are the same, calculating a sum of all values included in each key-value pair set to obtain a total value of the values included in each key-value pair set, obtaining a load status of each reduce processor in a reduce processor set, assigning a corresponding key-value pair set to each reduce processor according to the total value of the values included in each key-value pair set and the load status of each reduce processor, and processing the assigned key-value pair set using each reduce processor.

9 Claims, 5 Drawing Sheets

(51) Int. Cl.
*G06F 9/50* (2006.01)
*G06F 16/30* (2019.01)
*G06F 9/48* (2006.01)
*G06F 16/2453* (2019.01)
*G06F 16/2455* (2019.01)
*G06F 9/455* (2018.01)

(52) U.S. Cl.
CPC .............. *G06F 16/00* (2019.01); *G06F 16/30* (2019.01); *G06F 9/45558* (2013.01); *G06F 16/24545* (2019.01); *G06F 16/24554* (2019.01)

(56) References Cited

U.S. PATENT DOCUMENTS

| | | | |
|---|---|---|---|
| 2013/0290972 A1 | 10/2013 | Cherkasova et al. | |
| 2013/0332608 A1* | 12/2013 | Shiga | G06F 9/5088 709/226 |
| 2014/0033223 A1 | 1/2014 | Swart et al. | |
| 2014/0282391 A1* | 9/2014 | Doughan | G06F 9/4488 717/116 |
| 2014/0344542 A1* | 11/2014 | Huang | G06F 16/907 711/164 |
| 2017/0097853 A1 | 4/2017 | Chen et al. | |

FOREIGN PATENT DOCUMENTS

| | | |
|---|---|---|
| CN | 102799628 A | 11/2012 |
| CN | 103678609 A | 3/2014 |
| CN | 103853727 A | 6/2014 |
| CN | 103970604 A | 8/2014 |

OTHER PUBLICATIONS

Machine Translation and Abstract of Chinese Publication No. CN103678609, dated Mar. 26, 2014, 18 pages.
Machine Translation and Abstract of Chinese Publication No. CN103853727, dated Jun. 11, 2014, 12 pages.
Foreign Communication From a Counterpart Application, PCT Application No. PCT/CN2015/097179, English Translation of International Search Report dated Mar. 15, 2016, 2 pages.
Foreign Communication From a Counterpart Application, PCT Application No. PCT/CN2015/097179, English Translation of Written Opinion dated Mar. 15, 2016, 5 pages.
Foreign Communication From a Counterpart Application, European Application No. 15871867.6, Extended European Search Report dated Sep. 13, 2017, 8 pages.
Machine Translation and Abstract of Chinese Publication No. CN102662639, dated Sep. 12, 2012, 12 pages.
Machine Translation and Abstract of Chinese Publication No. CN102799628, dated Nov. 28, 2012, 15 pages.
Foreign Communication From a Counterpart Application, Chinese Application No. 201410836226.5, Chinese Office Action dated Aug. 24, 2018, 8 pages.

* cited by examiner

BIG-DATA PROCESSING METHOD AND APPARATUS

CROSS-REFERENCE TO RELATED APPLICATIONS

This application is a continuation of International Patent Application No. PCT/CN2015/097179 filed on Dec. 11, 2015, which claims priority to Chinese Patent Application No. 201410836226.5 filed on Dec. 26, 2014. The disclosures of the aforementioned applications are hereby incorporated by reference in their entireties.

TECHNICAL FIELD

The present disclosure relates to the field of data processing, and in particular, to a big-data processing method and apparatus.

BACKGROUND

Big data is a dataset including massive data. The data may be referred to as subdata of the big data. Only a small amount of subdata of the big data has a relatively high value for users. To help users browse big data, the big data can be processed currently, and subdata that is included in the big data and that has a relatively high value is provided to the users preferentially. For example, in the search engine field, a search engine obtains, by means of search, numerous search results according to a keyword entered by a user. The numerous search results form a piece of big data. The search engine processes the big data to obtain a search result that has a relatively high value for the user, and provides the search result to the user preferentially.

Currently, big data can be processed in the following process A mapping module performs map processing on to-be-processed big data and outputs at least one key-value pair corresponding to subdata of the big data. A key in the key-value pair corresponding to the subdata is the subdata, and a value is another piece of subdata, having a preset relationship with the key, of the big data. Then, all key-value pairs including a same key are assigned to a reduce processing module in a reduce processing module set. The reduce processing module processes values in the key-value pairs and outputs a value degree of the key. Because the key is subdata, the value degree of the subdata is obtained. According to the foregoing method, a value degree of each piece of subdata of big data can be obtained, subdata with a higher value degree is more valuable for a user, and subdata included in the big data is displayed to a user according to a value degree.

In a process of implementing the present disclosure, the inventor finds the following problem.

Currently, all key-value pairs are assigned to corresponding reduce processing modules according to keys of the key-value pairs. This may result in load imbalance of all reduce processing modules.

SUMMARY

To resolve the problem, embodiments of the present disclosure provide a big-data processing method and apparatus. The technical solutions are as follows.

According to a first aspect, an embodiment of the present disclosure provides a big-data processing method, where the method includes obtaining multiple key-value pair sets, where each of the key-value pair sets includes at least one key-value pair, a key and a value in the key-value pair are two pieces of subdata in to-be-processed big data, there is a preset data relationship between the two pieces of subdata, and remainders of modulo operations on all key-value pairs in said each key-value pair set are the same, calculating a sum of all values included in each key-value pair set to obtain a total value of the values included in said each key-value pair set, obtaining a load status of each reduce processing module in a reduce processing module set, assigning a corresponding key-value pair set to each reduce processing module according to the total value of the values included in said each key-value pair set and the load status of said each reduce processing module, and processing the assigned key-value pair set using said each reduce processing module.

In a first possible implementation manner of the first aspect, the step of obtaining multiple key-value pair sets includes processing, using a map processing module, the big data to obtain multiple key-value pairs, separately performing a modulo operation on keys of the obtained multiple key-value pairs according to a preset modulo coefficient, to obtain remainders of the multiple key-value pairs, and assigning multiple key-value pairs with a same remainder to one key-value pair set, to form the multiple key-value pair sets.

With reference to the first possible implementation manner of the first aspect, in a second possible implementation manner of the first aspect, the modulo coefficient=quantity of reduce processing modules× modulo factor, and the modulo factor is predetermined.

In a third possible implementation manner of the first aspect, the step of assigning a corresponding key-value pair set to each reduce processing module according to the total value of the values included in said each key-value pair set and the load status of said each reduce processing module includes determining a current quantity of assignment times of the key-value pair sets, finding, according to the determined current quantity of assignment times of the key-value pair sets, an assignment proportion of the key-value pair set corresponding to the quantity of assignment times, where a correspondence between the quantity of assignment times and the assignment proportion of the key-value pair set is preset, obtaining a corresponding quantity of key-value pair sets from the multiple key-value pair sets according to the obtained assignment proportion of the key-value pair sets, and assigning the corresponding key-value pair set to each reduce processing module according to the load status of each reduce processing module and the total value of the values included in each key-value pair set obtained according to the assignment proportion.

With reference to the third possible implementation manner of the first aspect, in a fourth possible implementation manner of the first aspect, the step of assigning the corresponding key-value pair set to each reduce processing module according to the load status of each reduce processing module and the total value of the values included in each key-value pair set obtained according to the assignment proportion includes assigning the corresponding key-value pair set to each reduce processing module according to an assignment rule that a key-value pair set with a larger total value is assigned to a reduce processing module with less load.

According to a second aspect, an embodiment of the present disclosure provides a big-data processing apparatus, where the apparatus includes a first obtaining module configured to obtain multiple key-value pair sets, where each of the key-value pair sets includes at least one key-value pair, a key and a value in the key-value pair are two pieces of subdata in to-be-processed big data, there is a preset data relationship between the two pieces of subdata, and remainders of modulo operations on all key-value pairs in said each key-value pair set are the same, a calculation module configured to calculate a sum of all values included in each key-value pair set to obtain a total value of the values included in said each key-value pair set, a second obtaining module configured to obtain a load status of each reduce processing module in a reduce processing module set, an assignment module configured to assign a corresponding key-value pair set to each reduce processing module according to the total value of the values included in said each key-value pair set and the load status of said each reduce processing module, and a processing module configured to process the assigned key-value pair set using said each reduce processing module.

In a first possible implementation manner of the second aspect, the first obtaining module is configured to process, using a map processing module, the big data to obtain multiple key-value pairs, separately perform a modulo operation on keys of the obtained multiple key-value pairs according to a preset modulo coefficient, to obtain remainders of the multiple key-value pairs, and assign multiple key-value pairs with a same remainder to one key-value pair set, to form the multiple key-value pair sets.

With reference to the first possible implementation manner of the second aspect, in a second possible implementation manner of the second aspect, the modulo coefficient=quantity of reduce processing modules× modulo factor, and the modulo factor is predetermined.

In a third possible implementation manner of the second aspect, the assignment module is configured to determine a current quantity of assignment times of the key-value pair sets, find, according to the determined current quantity of assignment times of the key-value pair sets, an assignment proportion of the key-value pair set corresponding to the quantity of assignment times, where a correspondence between the quantity of assignment times and the assignment proportion of the key-value pair set is preset, obtain a corresponding quantity of key-value pair sets from the multiple key-value pair sets according to the obtained assignment proportion of the key-value pair set, and assign the corresponding key-value pair set to each reduce processing module according to the load status of each reduce processing module and the total value of the values included in each key-value pair set obtained according to the assignment proportion.

With reference to the third possible implementation manner of the second aspect, in a fourth possible implementation manner of the second aspect, the assignment module is further configured to assign the corresponding key-value pair set to each reduce processing module according to an assignment rule that a key-value pair set with a larger total value is assigned to a reduce processing module with less load.

The technical solutions provided by the embodiments of the present disclosure bring about the following beneficial effects.

According to the big-data processing method and apparatus that are provided by the embodiments of the present disclosure, key-value pairs in each partition are assigned to corresponding reduce processing modules according to a total value in each key-value pair set in the partition and a load status of each reduce processing module. Relative to a common case in which all key-value pairs are assigned to corresponding reduce tasks according to keys of the key-value pairs, in the present disclosure, the reduce processing modules are more load-balanced.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show only some embodiments of the present disclosure.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure.

Unless otherwise defined, a technical term or a scientific term used herein should have a general meaning understood by persons of ordinary skill in the art of the present disclosure. In the specification and claims of the patent application of the present disclosure, the terms "first," "second," and the like are not intended to indicate any order, quantity or significance, but are intended to distinguish between different components. Likewise, "a/an," "one," or the like is not intended to indicate a quantity limitation, but is intended to indicate existing at least one. "Connection," "link," or the like is not limited to a physical or mechanical connection, but may include an electrical connection, whether directly or indirectly.

Figure 1:
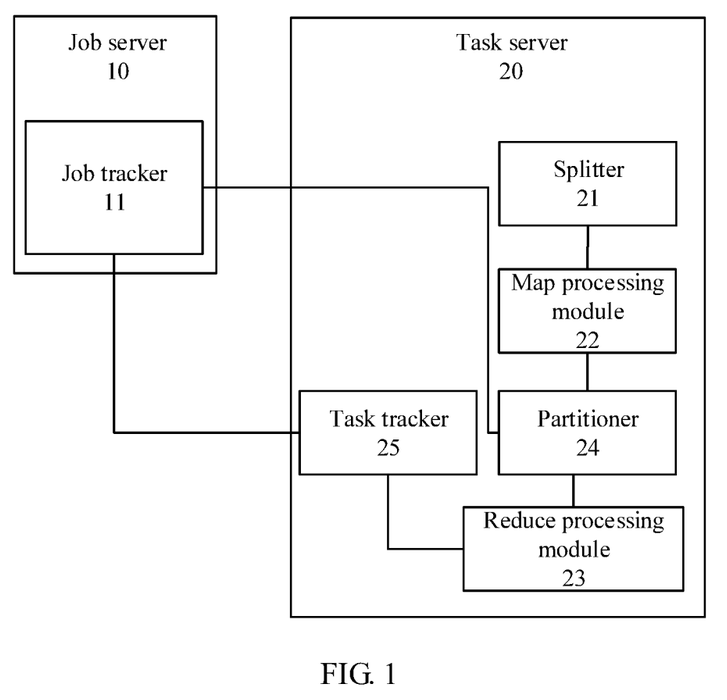
FIG. 1 is a schematic structural diagram of an implementation environment involved in a big-data processing method according to an embodiment of the present disclosure.

Referring to FIG. 1, FIG. 1 shows a schematic structural diagram of an implementation environment used in a virtual-machine processing method according to an embodiment of the present disclosure. A system includes a job server 10 and a task server 20 that exchanges data with the job server 10.

A job tracker 11 is disposed on the job server 10. The job tracker 11 assigns, based on a preset assignment rule, a corresponding key-value pair set to each reduce processing module 23 according to a total value that is included in each key-value pair set and that is transmitted by the task server 20 and a load status, directly obtained from a reduce processing module set, of each reduce processing module 23. A process of assigning the corresponding key-value pair set to each reduce processing module 23 includes establishing a correspondence between each key-value pair set and each reduce processing module 23, and feeding back the established correspondence between each key-value pair set and each reduce processing module 23 to the task server 20.

A splitter 21, a map processing module 22, a reduce processing module 23, a partitioner 24, and a task tracker 25 are disposed on the task server 20. The splitter 21 is configured to split big data into multiple data fragments, to facilitate processing of the big data by the map processing module 22. The map processing module 22 is configured to perform map processing on the multiple data fragments obtained from the big data, to obtain multiple key-value pairs, and send the obtained multiple key-value pairs to the partitioner 24. The partitioner 24 is configured to perform a modulo operation on the obtained key-value pairs, assign key-value pairs with a same remainder to one key-value pair set, obtain a total value in each key-value pair set by means of calculation, and transmit the obtained total value in the key-value pair set to the job tracker 11. The task tracker 25 is configured to obtain a correspondence, fed back by the job tracker 11, between each key-value pair set and each reduce processing module 23, determine a current quantity of assignment times of the key-value pair sets, find, according to the determined quantity of assignment times, an assignment proportion of the key-value pair set corresponding to the quantity of assignment times, and control, according to the assignment proportion of the key-value pair set, each reduce processing module 23 to obtain, from the partitioner 24, key-value pair sets whose quantity corresponds to the assignment proportion. The reduce processing module 23 is configured to process the obtained key-value pair sets and output processing results.

The total value in the key-value pair set is obtained by accumulating values of all key-value pairs in the key-value pair set.

Figure 2:
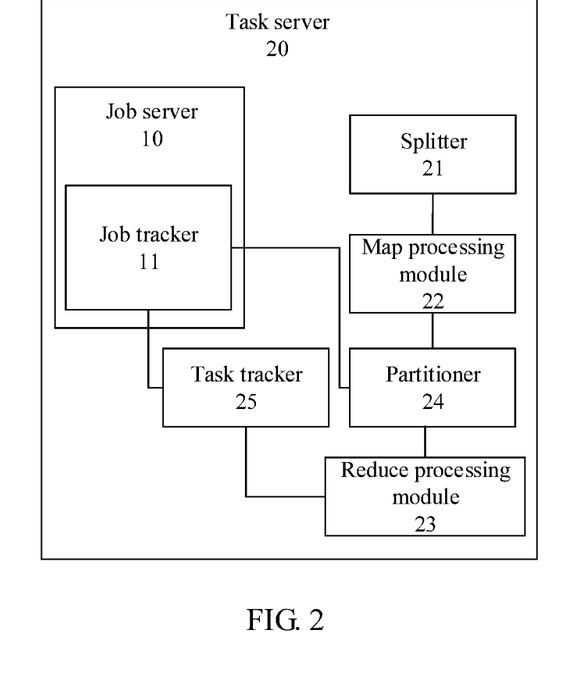
FIG. 2 is a schematic structural diagram of another implementation environment involved in a big-data processing method according to an embodiment of the present disclosure.

Optionally, referring to FIG. 2, FIG. 2 shows a schematic structural diagram of another implementation environment involved in a big-data processing method according to an embodiment of the present disclosure. In the implementation scenario, the job server 10 is disposed on the task server 20 as a function module.

EMBODIMENT 1

Figure 3:
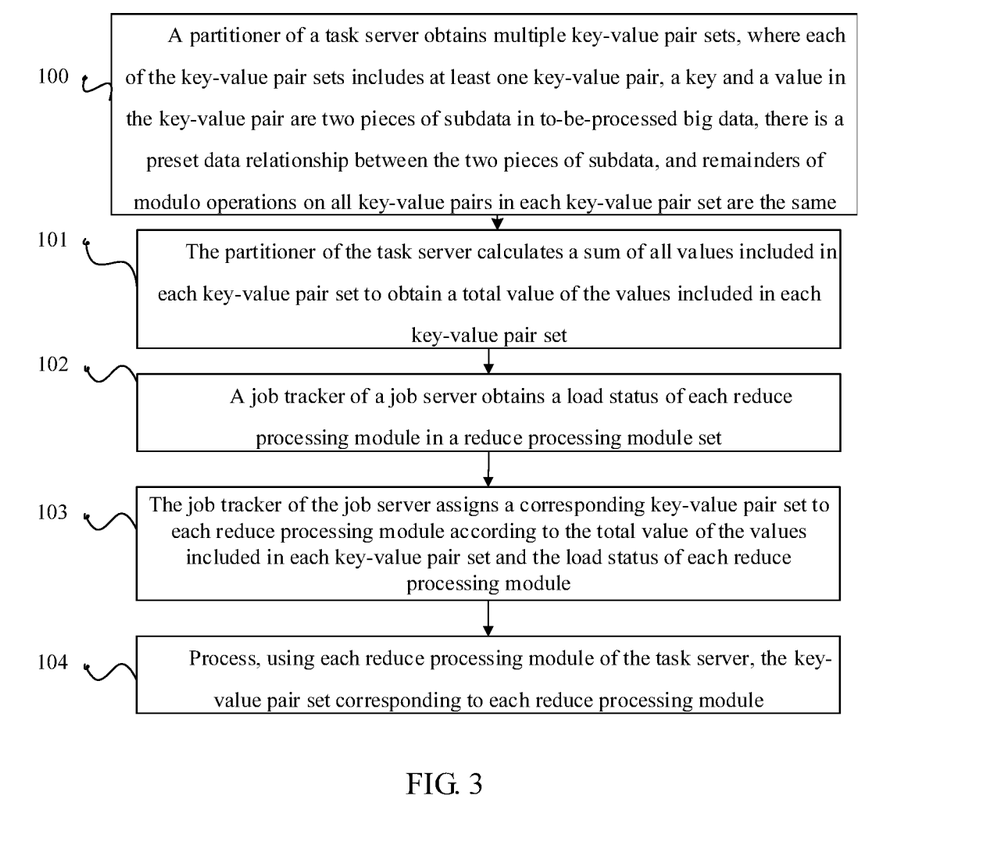
FIG. 3 is a flowchart of a big-data processing method according to Embodiment 1 of the present disclosure.

Referring to FIG. 3, this embodiment of the present disclosure provides a big-data processing method. A procedure of the method includes the following steps.

Step 100: A partitioner of a task server obtains multiple key-value pair sets, where each of the key-value pair sets includes at least one key-value pair, a key and a value in the key-value pair are two pieces of subdata in to-be-processed big data, there is a preset data relationship between the two pieces of subdata, and remainders of modulo operations on all key-value pairs in each key-value pair set are the same.

Step 101: The partitioner of the task server calculates a sum of all values included in each key-value pair set to obtain a total value of the values included in each key-value pair set.

Step 102: A job tracker of a job server obtains a load status of each reduce processing module in a reduce processing module set.

Step 103: The job tracker of the job server assigns a corresponding key-value pair set to each reduce processing module according to the total value of the values included in each key-value pair set and the load status of each reduce processing module.

Step 104: Process, using each reduce processing module of the task server, the key-value pair set corresponding to each reduce processing module.

According to the big-data processing method provided by this embodiment, key-value pairs in each partition are assigned to corresponding reduce processing modules according to a total value in each key-value pair set in the partition and a load status of each reduce processing module. Relative to a common case in which all key-value pairs are assigned to corresponding reduce tasks according to keys of the key-value pairs, in the present disclosure, the reduce processing modules are more load-balanced.

EMBODIMENT 2

Figure 4:
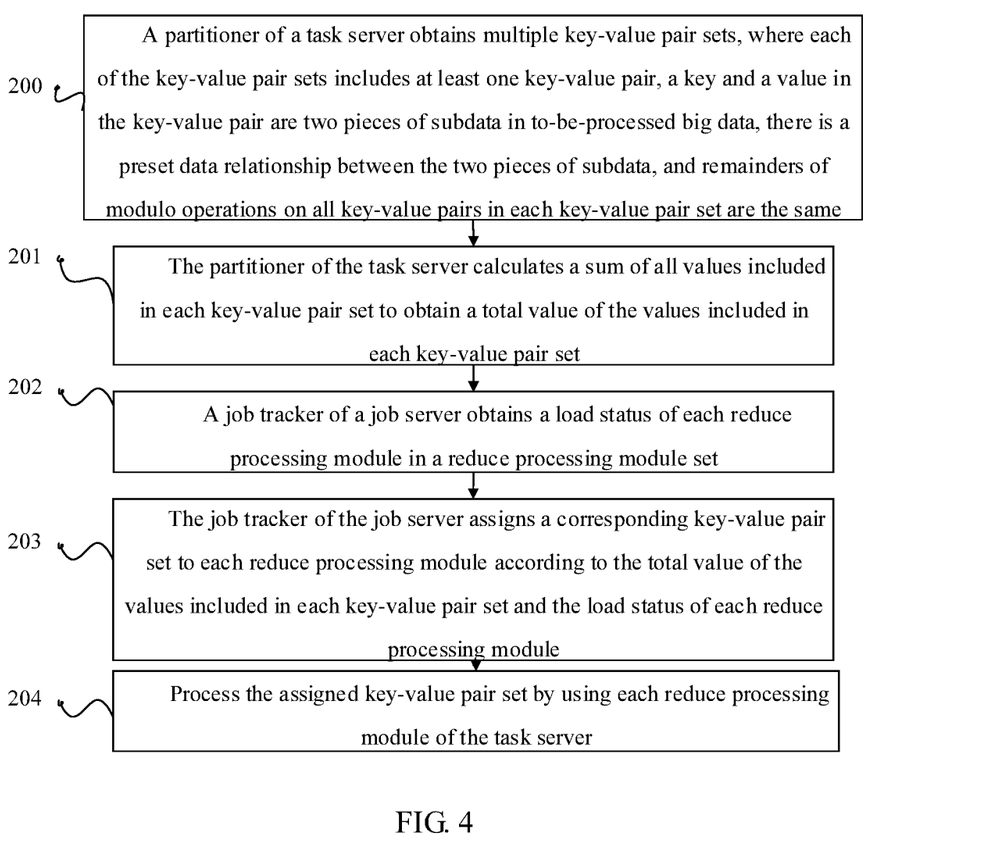
FIG. 4 is a flowchart of a big-data processing method according to Embodiment 2 of the present disclosure.

Referring to FIG. 4, this embodiment of the present disclosure provides a big-data processing method. A procedure of the method includes the following steps.

Step 200: A partitioner of a task server obtains multiple key-value pair sets, where each of the key-value pair sets includes at least one key-value pair, a key and a value in the key-value pair are two pieces of subdata in to-be-processed big data, there is a preset data relationship between the two pieces of subdata, and remainders of modulo operations on all key-value pairs in each key-value pair set are the same.

The preset data relationship between the key and the value refers to a correspondence, obtained by a map processing module, between a search condition for the big data and a search result obtained after a search for the big data is completed. The search condition is the key, and the search result is the value. The correspondence between the search condition for the big data and the search result obtained after the search for the big data is completed forms a key-value pair. When the map processing module searches the big data using a search condition and obtains a corresponding search result, a key-value pair is output in a form of (the search condition, the search result).

For example, if a quantity of characters "华" in a book needs to be found, the character "华" is a search condition, and the quantity of characters "华" is a search result. In this case, the map processing module searches the book for the quantity of characters "华" according to the character "华", and outputs a key-value pair in a form of ("华", the quantity of characters "华") after a search is completed. If a web page with a hyperlink including "中华" needs to be found in a web page set, the hyperlink including "中华" is a search condition, and the web page with the hyperlink including "中华" is a search result. In this case, the map processing module searches, according to the hyperlink including "中华", the web page set for the web page with the hyperlink including "中华", and outputs a key-value pair in a form of (the hyperlink including "中华", the web page with the hyperlink including "中华") after a search is completed.

A procedure in step 200 is further described as step 2001 to step 2003.

Step 2001: The map processing module of the task server processes the big data to obtain multiple key-value pairs.

Further, the big data processed by the map processing module is multiple data blocks obtained by splitting the to-be-processed big data by a splitter of the task server. After receiving the multiple data blocks transmitted by the splitter, the map processing module determines, by means of searching according to a preset key, whether there is content of the key in each received data block, and obtains a search result in a form of a key-value pair.

For example, in the search engine field, each search result included in big data is entered. When a user needs to find a web page with a hyperlink including "中华" in numerous web pages on a network, the user finds, after retrieval, 100 web pages with the hyperlink including "中华". In the 100 web pages, hyperlinks A and B include "中华", the hyperlink A leads to web pages E, F, and G, and the hyperlink B leads to web pages F, G, and H. In this case, key-value pairs obtained after processing by the map processing module are (A, E), (A, F), (A, G), (B, F), (B, G), and (B, H).

The splitter splits the big data according to specific content of the big data. For example, if the to-be-processed big data is an electronic book, the electronic book may be split into multiple data blocks using one paragraph as a data block, or the electronic book may be split into multiple data blocks using one sentence as a data block. If the big data is a homepage set on a website, web pages in the homepage set on the website may be split into multiple data blocks using one web page as a data block.

The map processing module sends the key-value pairs obtained after processing to the partitioner.

Step 2002: The partitioner of the task server performs a modulo operation on keys of the obtained multiple key-value pairs according to a preset modulo coefficient, to obtain a remainder of each key-value pair.

Further, the partitioner of the task server receives the key-value pairs transmitted by the map processing module, and performs a hash operation on the keys of the key-value pairs to obtain digit strings corresponding to the keys. The partitioner performs a modulo operation on the digit strings for the keys of the key-value pairs according to the preset modulo coefficient, to obtain the remainder of each key-value pair.

Modulo coefficient=quantity of reduce processing modules× modulo factor. The modulo factor is predetermined and is stored in the partitioner of the task server.

Step 2003: The partitioner of the task server assigns multiple key-value pairs with a same remainder to one key-value pair set, to form the multiple key-value pair sets.

Each key-value pair set has a respective key-value pair set identifier.

According to the descriptions in step 2001 to step 2003, before the key-value pair sets are formed, the modulo operation is performed on the obtained key-value pairs according to the preset modulo coefficient. Because the modulo coefficient is equal to a product of a quantity of reduce tasks and the modulo factor, relative to a common modulo manner, the key-value pairs may be assigned to more key-value pair sets. In this way, the key-value pairs are assigned more evenly, and a time consumed for processing a key-value pair in a key-value pair set by each reduce processing module is more equalized.

Step 201: The partitioner of the task server calculates a sum of all values included in each key-value pair set to obtain a total value of the values included in each key-value pair set.

A larger total value in each key-value pair set indicates a longer time for processing the key-value pair set by a reduce processing module that obtains the key-value pair set.

After obtaining the total value in each key-value pair set, the partitioner generates a correspondence between each key-value pair set identifier and a total value in each key-value pair set, records the correspondence in a preset relationship list, and sends an obtained relationship list to a job tracker of a job server.

Step 202: A job tracker of a job server obtains a load status of each reduce processing module in a reduce processing module set.

The job tracker of the job server obtains the load status of each reduce processing module from a task tracker of the task server.

A load list recording the load status of each reduce processing module in the reduce processing module set is preset in the task tracker of the task server. The task tracker of the task server periodically obtains the load status of each reduce processing module, to update the load status of each reduce processing module recorded in the load list.

A correspondence between each reduce processing module identifier and a total value in an unprocessed key-value pair set is recorded in the load list.

Step 203: The job tracker of the job server assigns a corresponding key-value pair set to each reduce processing module according to the total value of the values included in each key-value pair set and the load status of each reduce processing module.

A procedure in step 203 is further described as step 2031 to step 2035.

Step 2031: The job tracker of the job server determines a current quantity of assignment times of the key-value pair sets.

The quantity of assignment times of the key-value pair sets is recorded in an assignment list in the job tracker of the job server in advance. An assignment proportion of the key-value pair sets corresponding to the quantity of assignment times is further recorded in the assignment list.

For example, the assignment list records a quantity 1 of assignment times and an assignment proportion 20%, a quantity 2 of assignment times and an assignment proportion 40%, a quantity 3 of assignment times and an assignment proportion 60%, a quantity 4 of assignment times and an assignment proportion 80%, and a quantity 5 of assignment times and an assignment proportion 100%.

The foregoing assignment list records only one manner of assigning the key-value pair set, or the key-value pair set may be assigned using another quantity of assignment times and a corresponding assignment proportion, and details are not described herein.

Step 2032: The job tracker of the job server finds, according to the determined current quantity of assignment times of the key-value pair sets, an assignment proportion of the key-value pair sets corresponding to the quantity of assignment times, where a correspondence between the quantity of assignment times and the assignment proportion of the key-value pair set is preset.

The job tracker of the job server finds, from the prestored assignment list according to the determined current quantity of assignment times of the key-value pair sets, the assignment proportion of the key-value pair sets corresponding to the quantity of assignment times.

Step 2033: The job tracker of the job server obtains a corresponding quantity of key-value pair sets from the multiple key-value pair sets according to the obtained assignment proportion of the key-value pair sets.

Further, the job tracker of the job server obtains, from the received relationship list according to the obtained assignment proportion of the key-value pair sets, correspondences between key-value pair set identifiers and total values in key-value pair sets, where a quantity of the correspondences corresponds to the assignment proportion.

For example, if the assignment list records that a current quantity of assignment times is 1 and that a corresponding assignment proportion is 40%, the job tracker obtains, from the current relationship list and for assignment, 40% of a total quantity of correspondences, recorded in the relationship list, between key-value pair set identifiers and total values in key-value pair sets. For example, the relationship list records 1000 correspondences between key-value pair set identifiers and total values in key-value pair sets, then 400 correspondences are used for assignment.

Step 2034: The job tracker of the job server assigns the corresponding key-value pair set to each reduce processing module according to the load status of each reduce processing module and the total value of the values included in each key-value pair set obtained according to the assignment proportion.

Further, the job tracker of the job server obtains a reduce processing module identifier from the load list, obtains a key-value pair set identifier from the relationship list, and assigns the corresponding key-value pair set to each reduce processing module according to a load status corresponding to the reduce processing module identifier, a total value corresponding to the key-value pair set identifier, and an assignment rule that a key-value pair set with a larger total value is assigned to a reduce processing module with less load. That is, the obtained reduce processing module identifier is associated with the obtained key-value pair set identifier to establish a correspondence between the key-value pair set and the reduce processing module, then the generated correspondence between the key-value pair set and the reduce processing module is fed back to the task tracker of the task server, and the task tracker controls, according to the correspondence between the key-value pair set and the reduce processing module, the reduce processing module to obtain the corresponding key-value pair set from the partitioner.

For example, there are three reduce processing modules A, B, and C, load of A is 10, load of B is 20, and load of C is 30. There are three to-be-assigned key-value pair sets a, b, and c, a total value in a is 30, a total value in b is 40, and a total value in c is 50. In this case, according to the assignment rule, the key-value pair set a is assigned to the reduce processing module C, the key-value pair set b is assigned to the reduce processing module B, and the key-value pair set c is assigned to the reduce processing module A. After the assignment is completed, the load of the reduce processing modules A, B, and C are all 60, and the reduce processing modules A, B, and C are load-balanced.

According to the descriptions in step 2034, the key-value pair set is assigned to each reduce processing module according to the assignment rule that a key-value pair set with a larger total value is assigned to a reduce processing module with less load, ensuring load balancing of each reduce processing module. Therefore, the reduce processing modules can complete assigned tasks simultaneously to the largest extent.

Step 204: Process the assigned key-value pair set using each reduce processing module of the task server.

According to the big-data processing method provided by this embodiment, key-value pairs in each partition are assigned to corresponding reduce processing modules according to a total value in each key-value pair set in the partition and a load status of each reduce processing module. Relative to a common case in which all key-value pairs are assigned to corresponding reduce tasks according to keys of the key-value pairs, in the present disclosure, the reduce processing modules are more load-balanced.

EMBODIMENT 3

Figure 5:
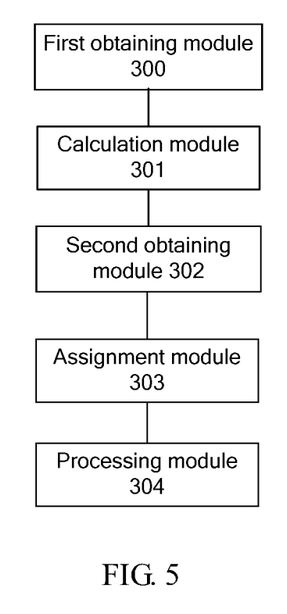
FIG. 5 is a schematic structural diagram of a big-data processing apparatus according to Embodiment 3 of the present disclosure.

Referring to FIG. 5, this embodiment of the present disclosure provides a big-data processing apparatus. The apparatus includes a first obtaining module 300, a calculation module 301, a second obtaining module 302, an assignment module 303, and a processing module 304.

Further, the first obtaining module 300 is configured to obtain multiple key-value pair sets, where each of the key-value pair sets includes at least one key-value pair, a key and a value in the key-value pair are two pieces of subdata in to-be-processed big data, there is a preset data relationship between the two pieces of subdata, and remainders of modulo operations on all key-value pairs in each key-value pair set are the same. The calculation module 301 is connected to the first obtaining module 300 and is configured to calculate a sum of all values included in each key-value pair set to obtain a total value of the values included in each key-value pair set. The second obtaining module 302 is connected to the calculation module 301 and is configured to obtain a load status of each reduce processing module in a reduce processing module set. The assignment module 303 is connected to the second obtaining module 302 and is configured to assign a corresponding key-value pair set to each reduce processing module according to the total value of the values included in each key-value pair set and the load status of each reduce processing module. The processing module 304 is connected to the assignment module 303 and is configured to process the assigned key-value pair set using each reduce processing module.

According to the big-data processing method provided by this embodiment, key-value pairs in each partition are assigned to corresponding reduce processing modules according to a total value in each key-value pair set in the partition and a load status of each reduce processing module. Relative to a common case in which all key-value pairs are assigned to corresponding reduce tasks according to keys of the key-value pairs, in the present disclosure, the reduce processing modules are more load-balanced.

EMBODIMENT 4

Figure 6:
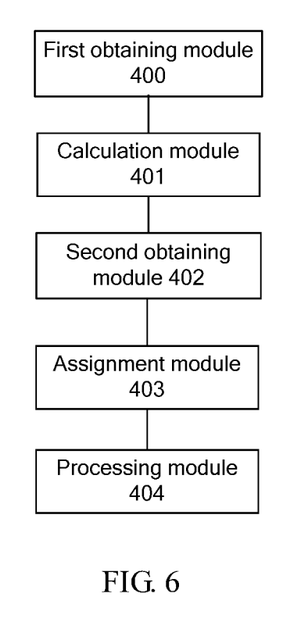
FIG. 6 is a schematic structural diagram of a big-data processing apparatus according to Embodiment 4 of the present disclosure.

Referring to FIG. 6, this embodiment of the present disclosure provides a big-data processing apparatus. The apparatus includes a first obtaining module 400, a calculation module 401, a second obtaining module 402, an assignment module 403, and a processing module 404.

Further, the first obtaining module 400 is configured to obtain multiple key-value pair sets, where each of the key-value pair sets includes at least one key-value pair, a key and a value in the key-value pair are two pieces of subdata in to-be-processed big data, there is a preset data relationship between the two pieces of subdata, and remainders of modulo operations on all key-value pairs in each key-value pair set are the same. The calculation module 401 is connected to the first obtaining module 400 and is configured to calculate a sum of all values included in each key-value pair set to obtain a total value of the values included in each key-value pair set. The second obtaining module 402 is connected to the calculation module 401 and is configured to obtain a load status of each reduce processing module in a reduce processing module set. The assignment module 403 is connected to the second obtaining module 402 and is configured to assign a corresponding key-value pair set to each reduce processing module according to the total value of the values included in each key-value pair set and the load status of each reduce processing module. The processing module 404 is connected to the assignment module 403 and is configured to process the assigned key-value pair set using each reduce processing module.

The first obtaining module 401 is further configured to process, using a map processing module, the big data to obtain multiple key-value pairs, separately perform a modulo operation on keys of the obtained multiple key-value pairs according to a preset modulo coefficient, to obtain remainders of the multiple key-value pairs, and assign multiple key-value pairs with a same remainder to one key-value pair set, to form the multiple key-value pair sets.

Further, modulo coefficient=quantity of reduce processing modules× modulo factor, and the modulo factor is predetermined.

The assignment module 403 is further configured to determine a current quantity of assignment times of the key-value pair sets, find, according to the determined current quantity of assignment times of the key-value pair sets, an assignment proportion of the key-value pair sets corresponding to the quantity of assignment times, where a correspondence between the quantity of assignment times and the assignment proportion of the key-value pair sets is preset, obtain a corresponding quantity of key-value pair sets from the multiple key-value pair sets according to the obtained assignment proportion of the key-value pair set, and assign the corresponding key-value pair set to each reduce processing module according to the load status of each reduce processing module and the total value of the values included in each key-value pair set obtained according to the assignment proportion.

The assignment module 403 is further configured to assign the corresponding key-value pair set to each reduce processing module according to an assignment rule that a key-value pair set with a larger total value is assigned to a reduce processing module with less load.

According to the big-data processing method provided by this embodiment, key-value pairs in each partition are assigned to corresponding reduce processing modules according to a total value in each key-value pair set in the partition and a load status of each reduce processing module. Relative to a common case in which all key-value pairs are assigned to corresponding reduce tasks according to keys of the key-value pairs, in the present disclosure, the reduce processing modules are more load-balanced.

It should be noted that, when the big-data processing apparatus provided by the foregoing embodiments processes big data, division of the foregoing function modules is taken as an example for illustration. In an actual application, the foregoing functions can be implemented by different function modules according to a requirement, that is, an inner structure of the apparatus is divided into different function modules to implement all or some of the functions described above. In addition, the big-data processing apparatus provided by the foregoing embodiments uses a same conception as the big-data processing method embodiment. For a specific implementation process thereof, reference is made to the method embodiments, and details are not repeatedly described herein.

The sequence numbers of the foregoing embodiments of the present disclosure are only for illustrative purposes, and are not intended to indicate priorities of the embodiments.

Persons of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

Finally, it should be noted that the foregoing embodiments are only intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A data processing method, comprising:
obtaining a plurality of key-value pair sets, wherein each key-value pair set comprises at least two key-value pairs, and wherein remainders of modulo operations on every key in each key-value pair set are the same;
obtaining a total value of every value in each key-value pair set;
obtaining a load status of a reduce processor; and
assigning each key-value pair set to the reduce processor according to the total value of every value in each key-value pair set and the load status of the reduce processor.

2. The method according to claim 1, wherein obtaining the plurality of key-value pair sets comprises:
obtaining a plurality of key-value pairs;
separately performing a modulo operation on each key of the plurality of key-value pairs according to a preset modulo coefficient in order to obtain remainders of the plurality of key-value pairs; and
assigning the at least two key-value pairs with a same remainder to each key-value pair set.

3. The method according to claim 2, wherein the preset modulo coefficient = quantity of reduce processors − modulo factor, and wherein the modulo factor is predetermined.

4. The method according to claim 1, wherein assigning each key-value pair set to the reduce processor comprises:
determining a current quantity of assignment times of the plurality of key-value pair sets;
determining, according to the current quantity of assignment times, an assignment proportion of the plurality of key-value pair sets corresponding to the current quantity of assignment times, wherein a correspondence between the current quantity of assignment times and the assignment proportion of the plurality of key-value pair sets is preset;
obtaining a corresponding quantity of key-value pair sets from the plurality of key-value pair sets according to the assignment proportion of the plurality of key-value pair sets, wherein corresponding quantity of key-value pair sets comprises each key-value pair set; and
assigning each key-value pair set to the reduce processor according to the total value of every value in each key-value pair set and the load status of the reduce processor.

5. A data processing apparatus, comprising:
a non-transitory memory storage comprising instructions; and
a processor coupled to the non-transitory memory storage, wherein the instructions cause the processor to be configured to:
obtain a plurality of key-value pair sets, wherein each key-value pair set comprises at least two key-value pairs, and wherein remainders of modulo operations on every key in each key-value pair set are the same;
obtain a total value of every value in each key-value pair set;
obtain a load status of a reduce processor; and
assign each key-value pair set to the reduce processor according to the total value of every value in each key-value pair set and the load status of the reduce processor.

6. The apparatus according to claim 5, wherein the instructions further cause the processor to be configured to:
obtain a plurality of key-value pairs;
separately perform a modulo operation on each key of the plurality of key-value pairs according to a preset modulo coefficient in order to obtain remainders of the plurality of key-value pairs; and
assign the at least two key-value pairs with a same remainder to each key-value pair set.

7. The apparatus according to claim 6, wherein the preset modulo coefficient = quantity of reduce processors − modulo factor, and wherein the modulo factor is predetermined.

8. The apparatus according to claim 5, wherein the instructions further cause the processor to be configured to:
determine a current quantity of assignment times of the plurality of key-value pair sets;
determine, according to the current quantity of assignment times, an assignment proportion of the plurality of key-value pair sets corresponding to the current quantity of assignment times, wherein a correspondence between the current quantity of assignment times and the assignment proportion of the plurality of key-value pair sets is preset;
obtain a corresponding quantity of key-value pair sets from the plurality of key-value pair sets according to the assignment proportion of the plurality of key-value pair sets, wherein corresponding quantity of key-value pair sets comprises each key-value pair set; and
assign each key-value pair set to the reduce processor according to the total value of every value in each key-value pair set and the load status of the reduce processor.

9. A computer-readable storage medium comprising:
instructions which, when executed by a computer, cause the computer to perform the following steps:
obtain a plurality of key-value pair sets, wherein each key-value pair set comprises at least two key-value pairs, and wherein remainders of modulo operations on every key in each key-value pair set are the same;
obtain a total value of every value in each key-value pair set;
obtain a load status of a reduce processor; and
assign each key-value pair set to the reduce processor according to the total value of every value in each key-value pair set and the load status of the reduce processor.

* * * * *

UNITED STATES PATENT AND TRADEMARK OFFICE
CERTIFICATE OF CORRECTION

PATENT NO. : 10,691,669 B2  
APPLICATION NO. : 15/481606  
DATED : June 23, 2020  
INVENTOR(S) : Xiaoli Wang Page 1 of 1

It is certified that error appears in the above-identified patent and that said Letters Patent is hereby corrected as shown below:

Claim 3, Column 12, Line 29: "processors - modulo" should read "processors × modulo"  
Claim 7, Column 13, Line 11: "processors - modulo" should read "processors × modulo"

Signed and Sealed this  
Twenty-fifth Day of August, 2020

Andrei Iancu  
*Director of the United States Patent and Trademark Office*